Patented Feb. 15, 1949

2,462,031

UNITED STATES PATENT OFFICE 2,462,031

CONDENSATION OF KETONES WITH FORMALDEHYDE

Harold Wittcoff, Minneapolis, Minn., assignor to General Mills, Inc., a corporation of Delaware No Drawing. Application June 16, 1945, Serial No. 599,947

8 Claims. (Cl. 260—333)

The present invention relates to polyhydroxy compounds resulting from the condensation of formaldehyde and ketones and to their method of preparation. The products which are formed involve a considerable amount of variation depending upon the ketone used as the starting material and the number of active replaceable hydrogen atoms which it contains. In general, the present invention is directed to the production of highly hydroxylated materials by allowing the condensation to proceed to its fullest extent.

Previous condensations of formaldehyde and various ketones have been reported in the literature. In general, however, these have involved reaction in aqueous solution in the presence of a basic catalyst over long periods of time ranging from several days to several weeks at room temperature slightly above room temperature. Other investigators have condensed ketones with formaldehyde in the presence of more strongly basic catalysts and at elevated temperatures to produce resinous materials of low hydroxyl content. Previous work has indicated that it is inadvisable to carry out such condensations at an elevated temperature to produce a highly hydroxylated compound. In view of the extreme exothermicity of this type of reaction, particularly where the temperature is elevated somewhat to begin with, it has not been thought possible to control this reaction or to conduct it in such a manner that a polyhydroxy material results. It has now been discovered that it is possible to conduct this condensation at an elevated temperature which permits the reaction to be completed in a short period of time, varying from a few minutes to several hours and at the same time to control the reaction so that highly hydroxylated compounds may be obtained which previously required several days to several weeks.

Moreover, in the processes shown in the prior literature difficulties have been encountered in the removal of the basic catalyst. These difficulties have been overcome in the present invention by a process of removing the basic catalyst which will be described in detail hereinafter. It has likewise been discovered that an optimum amount of catalyst may be used to obviate certain difficulties, such as discoloration, encountered in prior art methods.

It is, therefore, a primary object of the present invention to prepare hydroxylated compounds by the interaction of formaldehyde with a ketone at an elevated temperature and under suitable conditions which result in a highly hydroxylated compound. It is a further object of the present invention to provide an improved process for the removal of the catalyst employed in the condensation. It is a still further object of the present invention to provide a process of controlling the acidity of the final product.

These and other objects of the present invention will be apparent from the following detailed description of the invention. In general, the invention involves the interaction of formaldehyde with a ketone containing a plurality of active hydrogen atoms such that a plurality of hydroxymethyl groups may be introduced. Furthermore, in many instances the ketone group may be reduced to a hydroxyl group by a crossed Cannizzaro type of reaction. A wide variety of ketones may be used, such as alicyclic ketones, as for example, cyclohexanone and cyclopentanone; aliphatic ketones, particularly methyl aliphatic ketones such as acetone, methyl ethyl ketone, methyl propyl ketone, methyl isopropyl ketone, methyl butyl ketone, methyl isobutyl ketone, methyl sec.-butyl ketone, mesityl oxide, diacetone alcohol, levulinic acid; diethyl ketone, phorone and the like; diketones such as diacetyl, acetylacetone, and acetonylacetone; aliphatic aryl ketones such as acetophenone, propiophenone; aliphatic aralkyl ketones such as methyl benzyl ketone and its homologs. In general any ketone having active hydrogen atoms on a carbon atom adjacent to the carbonyl group may be used.

The formaldehyde employed may be in any suitable form, such as paraformaldehyde, trioxymethylene, or any other formaldehyde polymer which will liberate formaldehyde under the reaction condition. Since, however, the reaction is preferably carried out in aqueous solution it is preferred to employ the less expensive commercially available forms of formaldehyde such as Formalin. In general a slight excess of formaldehyde is used. Thus, if the ketone contains six replaceable hydrogen atoms and a carbonyl capable of reduction, it is desirable to use 7.5 or 8.0 molar equivalents of formaldehyde rather than the 7.0 moles required theoretically.

A suitable alkaline catalyst is employed in the condensation. Such materials as the oxides and hydroxides of alkaline earth metals have proved particularly efficacious. Bases such as the alkali metal hydroxides or organic bases such for example as trimethylbenzylammonium hydroxide or less highly substituted basic amines, may also be used. It is preferred, however, because of its efficacy and low cost to use a material such as ordinary lime or calcium oxide. When such a catalyst is used it may be removed from the reaction mixture after the condensation has been effected.

A further important aspect of the invention is the discovery of an optimum amount of catalyst to be used. When the amount of catalyst used is of the order of one mole based on the amount of ketone used, the condensation proceeds at a satisfactory rate but the product may be attended by marked discoloration. This is particularly true if the ketone is acetone, diacetyl, mesityl oxide, and the like. By reducing the catalyst to the order of about 0.25 to 0.75 mole, preferably about 0.5 mole, based on the ketone, the reaction still proceeds at a satisfactory rate but yields products which may be water-white to light yellow in color. This light color is an extreme advantage when the product is to be used for processes such as the formation of esters.

According to the present invention the reaction is conducted at an elevated temperature between 40° and 100° C., preferably 50° C. or above. The reaction is exothermic, the exothermic nature of the reaction being evident spontaneously in some instances and requiring the initial application of heat in others. Once the exothermic reaction starts it is frequently necessary to control the temperature by suitable cooling in order to prevent the reaction from becoming too violent. In some instances the temperature may be allowed to reach the maximum of 100° C. In others, it may be desirable to cool the reaction so as to maintain it within the range of 50-60° C. and to maintain that temperature for a longer period of time.

When the reaction has been completed the mixture is cooled and the catalyst is separated by precipitation. Previously, the catalyst has been precipitated by various means, including oxalic acid and sulfuric acid. The oxalic acid precipitates alkaline earth metals but the precipitate is extremely fine and very difficult to remove by filtration. Furthermore, oxalic acid is relatively expensive to use for this purpose. Sulfuric acid, on the other hand, may be used to remove the alkaline earth ion practically completely but this necessitates a slight excess of acid which in subsequent operations may produce very fundamentally undesirable changes in the product. Thus, in one instance where formaldehyde was condensed with acetone, the use of sulfuric acid to precipitate the catalyst resulted in a plastic resinuous material with low hydroxyl content. This is probably due to dehydration both internally and between two molecules of condensation product thus serving to remove hydroxyl groups. In the case of the condensation of formaldehyde with diacetyl, the employment of sulfuric acid as a precipitant produced a product of hydroxyl content of only 4.0%, whereas a portion of the same reaction in which the catalyst was precipitated as hereinafter described, resulted in a product with a hydroxyl content of the order of 20%.

It has been discovered that it is possible to precipitate a large part of the catalyst, even 90-95%, by means of dilute sulfuric acid such that the reaction mixture is only faintly acidic to Congo red test paper. Thereafter the remainder of the catalyst is precipitated by the use of oxalic acid which is added until the reaction mixture is definitely acid to Congo red test paper. The advantages are severalfold. In the first place, only a small amount of the more expensive reagent is used. In the second place, the resulting precipitate, a mixture of alkaline earth oxalate and sulfate with a preponderance of sulfate, is readily filterable. In the third place the extremely undesirable features attendant the use of sulfuric acid alone are avoided by causing oxalic acid to be the material in slight excess, rather than sulfuric acid. Phosphoric acid or other non-oxidizing acids may also be used either alone or in conjunction with oxalic acid to precipitate the catalyst.

Another important aspect of the invention is the discovery of methods for removing from the product any acidity which was necessary for the complete precipitation of the catalyst. This acidity is sometimes highly undesirable where the product is to be used for the preparation of esters and the like, since it may tend to promote discoloration. The removal of the acidity may be accomplished merely by bringing the reaction mixture to the point of neutrality with a base such as potassium or sodium hydroxide. The water may then be removed from the reaction mixture and the residue may be taken up in a solvent such as ethyl alcohol. The salts remain in suspension and may be removed by filtration to yield a substantially neutral solution of the product. Removal of the solvent yields the product in a desirable condition for further reaction.

Another method for the removal of a substantial portion of the acidity involves the use of a basic ion exchange material. The above-mentioned aqueous solution of the product may be subjected to the action of this resin either batchwise or in a continuous process by passing it through a column packed with the resin. There results a solution of a product which is only slightly acidic and from which the product may be recovered in a desirable condition.

The products resulting herefrom, after the water has been removed in vacuo, are generally sirups which usually contain a mixture of polyhydroxy compounds. Some of these compounds may crystallize readily from the sirup and others may not. If the product crystallizes it may be separated and purified in that manner and if this is done, it is usually not necessary to go through the previously described processes for removal of the acidity since the acid usually remains largely in the mother liquor and the last traces may be removed by recrystallization.

If the sirup is not readily crystallizable, and if a pure crystalline condensation product is desired, it may be obtained in some instances by forming an acetal, ester, or other derivative which may subsequently be hydrolyzed to the free hydroxy compound. The formation of an acetal often takes place readily when the crude sirup is stirred with acetone. Usually there is sufficient acid present as a result of the method of preparation to catalyze acetal formation. If necessary, a small amount of acid catalyst, such as sulfuric acid, may be added. As an alternative, an acetal derivative may be obtained by heating the sirup in aqueous methanol with an aldehyde such as benzaldehyde and a small amount of mineral acid for a suitable period of time. The acetal, such as the benzal derivative, may be isolated from the solution by filtration after which it may be purified by crystallization from a suitable solvent such as alcohol. The isolated acetal derivative may be converted to the hydroxy compound by treatment with a strong acid, such as hydrochloric acid. The volatile ketone or aldehyde may then be distilled off leaving the pure hydroxy compound as a light-colored oil which crystallizes readily on cooling. Where the aldehyde liberated is as high boiling as benzaldehyde, the application of vacuum or the use of steam distillation is desirable.

The following examples will serve to illustrate the invention and are not to be considered limitations thereof.

Example 1

*The condensation product of acetone and formaldehyde*

In an appropriate vessel equipped with agitator and reflux condenser were placed 580 parts of acetone, 6,500 parts of 37% formaldehyde solution (8 molar equivalents) and 2,000 parts of water. The quantity of water may be decreased, if desired. There was added 280 parts of calcium oxide with stirring at a rate such that the temperature did not exceed 50° C. After complete addition, the reaction mixture was maintained with stirring at 50° C. for two hours. The cooled solution was treated with 90% of the requisite amount of dilute sulfuric acid or until Congo red paper indicated a slightly acidic reaction. Thereafter, the reaction mixture was made strongly acid to Congo red paper with oxalic acid solution. The easily filterable precipitate of calcium oxalate and calcium sulfate was removed, whereupon the aqueous solution was stirred for several hours with 2,000 parts of a basic ion exchange resin. The pH of the solution, accordingly, was raised to between 5 and 6 which is sufficiently low acidity to yield an excellent product. The resin is then removed by filtration. After the treatment with the resin, it may be necessary to treat the solution with charcoal in order to remove color imparted by the resin. Thereafter, the solution is desolvated in vacuo to yield a water-white or only slightly yellow sirup. If it is desired to remove occluded moisture from this sirup, the product is dissolved in alcohol and treated with an equal volume of water-immiscible solvent such as benzene. Removal of this material by distillation effects simultaneous azeotropic distillation of the water to yield an essentially anhydrous product of hydroxyl content of 28–30%, and which contains a substantial amount of an anhydroenneaheptitol which may be more accurately described as tetrahydro-3,3,5,5-tetrakis-(hydroxymethyl)-4-pyranol. The product may be used as such or in aqueous solution. If the latter state is desired, the original aqueous reaction mixture need be concentrated only until there results a solution of desired concentration.

Example 2

*The condensation product of acetone and formaldehyde*

The above precedure was followed save that the temperature was allowed to rise spontaneously to 90° C., whereupon the reaction mixture was cooled to room temperature and the product was isolated according to the previously described techniques.

The effect of using only sulfuric acid as a precipitant was demonstrated in an experiment in which the reaction mixture prior to precipitation of the catalyst was divided into two equal portions. One portion was treated as previously described to obtain a product of hydroxyl content of 27.3%. The second portion was made completely acid to Congo red paper with dilute sulfuric acid, after which the precipitated calcium sulfate was removed and the filtrate was desolvated in vacuo. There resulted a thick, rubbery, gel whose hydroxyl content had been reduced to 13.7%.

Example 3

*Crystalline 3,3,5,5-tetrakis-(hydroxymethyl)-4-pyranol*

To prepare the crystalline material it is not necessary to remove the acid from the condensation product. A crystalline diacetone derivative was obtained from the sirupy condensation product of acetone and formaldehyde of Example 1 by allowing a mixture of equal volumes of the sirup and acetone to remain over night. There resulted a crystalline precipitate of a diacetone derivative of the anhydroenneaheptitol which was filtered and crystallized several times from alcohol to yield a product melting at 229° C. The formation of this material was catalyzed by the residual acid in the sirupy condensation product. This diacetone derivative was dissolved in a dilute solution of hydrochloric acid in order to effect hydrolysis after which the aqueous phase including the acetone which resulted from the cleavage was evaporated to yield a theoretical amount of a crystalline anhydroenneaheptitol which on crystallization from alcohol yielded a product melting at 156° C. This product was shown by various analytical techniques to possess structure I.

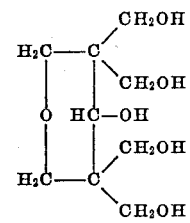

I

Similarly a benzal derivative was prepared by treating 100 parts of the sirupy condensation product with 120 parts of benzaldehyde dissolved in 120 parts of water and 300 parts of methyl alcohol. To this solution was added 20 parts of concentrated hydrochloric acid, after which the solution was refluxed for one to three hours. The gummy product was washed with hot methanol to obtain an extremely insoluble benzal derivative melting at 300° C. This product, also, could be hydrolyzed with concentrated hydrochloric acid to yield the free hydroxy compound.

Example 4

*The condensation product of methyl ethyl ketone and formaldehyde*

In an appropriate vessel were placed 288 parts of methyl ethyl ketone, 780 parts of formaldehyde as paraformaldehyde and 3,000 parts of water. There was added slowly with stirring 112 parts of calcium oxide whereupon the temperature rose spontaneously to 50° C. Thereafter, cooling was employed so that the temperature would not rise higher and once the initial exothermic reaction had subsided, the reaction mixture was heated and stirred at 50°–55° C. for two hours. The product was worked up as described in Example 1 for the condensation product of acetone and formaldehyde to yield an almost colorless sirup whose hydroxyl content was of the order of 30%. Certain analytical investigations would indicate that the chief constituent of this sirup is a desoxyanhydroenneaheptitol of structure II.

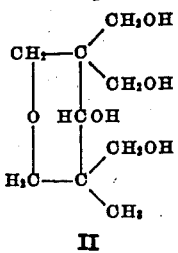

II

Example 5

*The condensation product of cyclopentanone and formaldehyde*

A reaction mixture consisting of 84 parts of cyclopentanone, 165 parts of paraformaldehyde and 1200 parts of water was treated with 28 parts of calcium oxide after which the reaction mixture was heated and stirred at 60° C. for 30 minutes. The filtered solution was acidified to Congo red paper with dilute sulfuric acid solution whereupon the precipitated calcium sulfate was removed by filtration and the filtrate was desolvated to yield an oil whose hydroxyl content was 27.4%. The hydroxyl content of 2,2,5,5-tetramethylolcyclopentanone is 33.3%, indicating that this was probably the chief constituent of the sirupy mixture. Some discoloration was observed as a result of the use of sulfuric acid alone as a precipitant. This may be obviated by employing the mixture of precipitants indicated in previous examples.

Example 6

*The condensation product of cyclohexanone and formaldehyde*

In an appropriate vessel equipped with agitator and reflux condenser were placed 392 parts of cyclohexanone, 660 parts of formaldehyde in the form of paraformaldehyde, 3500 parts of water, and 112 parts of calcium oxide. With stirring the temperature of the solution rose spontaneously to 55° C., whereupon the exothermic nature of the reaction was checked by external cooling. Thereafter the reaction mixture was heated and stirred at 50–55° C. for two hours. The reaction mixture, after having been acidified to Congo red paper with dilute sulfuric acid, was filtered and desolvated to yield a sirup which crystallized readily on trituration with alcohol. Crystallization from absolute ethanol yielded a product melting at 130–131° C. whose structure is indicated by III.

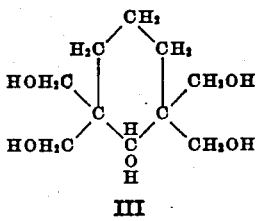

III

Example 7

*The condensation product of diacetyl and formaldehyde*

In an appropriate vessel equipped with agitator and reflux condenser were placed 860 parts of diacetyl and 2700 parts of formaldehyde as an aqueous solution. Sufficient water was added to yield a total of 15,000 parts of water, and 280 parts of calcium oxide was added with stirring at a rate such that the temperature did not rise above 55° C. Thereafter the reaction mixture was maintained at that temperature for one hour whereupon the reaction mixture was worked up as indicated in Example 1 to obtain a sirup whose constituents were complex in structure and whose hydroxyl content was of the order of 20%.

The adverse effect resulting from the use of sulfuric acid alone as a precipitant was demonstrated in an experiment in which a portion of the reaction mixture was treated only with sulfuric acid to precipitate the catalyst. The product resulting in this case had a hydroxyl content of 4.0%.

Example 8

*The condensation product of mesityl oxide and formaldehyde*

The reaction was carried out according to the procedure indicated in Example 1, using 245 parts of mesityl oxide, 412.5 parts of paraformaldehyde, 3500 parts of water, and 35 parts of calcium oxide. In this reaction it was found advisable to use even less than one-half molar equivalent of catalyst. The reaction mixture was maintained at 40°–50° C. for two hours, after which it was worked up as indicated in Example 1. Prior to desolvation, however, the aqueous solution was extracted with ether in order to remove unreacted starting material and any ether-soluble products in which only a small amount of condensation has occurred. The ether extraction process is valuable wherever a high-boiling ketone is used as starting material. There resulted a sirup which was light in color and which possessed a hydroxyl content of the order of 24%.

It will be apparent from the above description that the present invention provides a novel process of producing highly hydroxylated compounds by the condensation of formaldehyde and ketones. The yields are good and the products are of high quality. They have been found particularly useful in the preparation of esters as described and claimed in my co-pending applications filed of even date herewith and entitled Esters, Serial No. 599,948, Rosin acid esters, Serial No. 599,949, and Alkyd resins, Serial No. 599,950.

While various modifications of the invention have been described in detail, it will be apparent that other modifications are possible without departing from the spirit of the invention as defined in the appended claims.

I claim as my invention:

1. Process for the production of hydroxy condensation products having at least four hydroxyl groups, which comprises condensing formaldehyde and a ketone having at least four replaceable hydrogen atoms adjacent the carbonyl group, in a molal ratio of not substantially less than one mole of formaldehyde per mole of replaceable hydrogen in the ketone, at a temperature within the approximate range of 40–100° C. in the presence of an alkaline catalyst in the amount of from 0.25 to 0.75 mole per mole of ketone, and stopping the reaction when the reaction mixture contains mainly condensation products having at least four hydroxyl groups.

2. Process for the production of hydroxy condensation products having at least four hydroxyl groups, which comprises condensing formaldehyde and a ketone having at least four replaceable hydrogen atoms adjacent the carbonyl group, in molal ratio of not substantially less than one mole of formaldehyde per mole of replaceable hydrogen in the ketone, at a temperature within the approximate range of 40–100° C. in the presence of an alkaline catalyst in the amount of from about 0.25 to 0.75 mole per mole of ketone, for a period of time ranging from a few minutes to several hours, the shorter period of time being employed where the temperature is near the upper part of the range, and cooling the reaction mixture and recovering the condensation product.

3. Process according to claim 1 further characterized in that the ketone is an aliphatic ketone.

4. Process according to claim 1 further characterized in that the ketone is an alicyclic ketone.

5. Process for the production of hydroxy condensation products having at least four hydroxyl groups, which comprises condensing formaldehyde and a ketone having at least four replaceable hydrogen atoms adjacent the carbonyl group, in a molal ratio of not substantially less than one mole of formaldehyde per mole of replaceable hydrogen in the ketone, at a temperature within the approximate range of 50–100° C. in the presence of an alkaline catalyst in the amount of from 0.25 to 0.75 mole per mole of ketone, and stopping the reaction when the reaction mixture contains mainly condensation products having at least four hydroxyl groups.

6. Process for the production of 2,2,6,6-tetramethylolcyclohexanol which comprises condensing formaldehyde with cyclohexanone in a molal ratio of not substantially less than four moles of formaldehyde per mole of cyclohexanone, at a temperature within the approximate range of 40–100° C. in the presence of an alkaline catalyst in the amount of from about 0.25 to 0.75 mole per mole of cyclohexanone, and stopping the reaction when the reaction mixture contains largely 2,2,6,6-tetramethylolcyclohexanol.

7. Process for the production of teterahydro-3,3,5,5 - tetrakis - (hydroxymethyl) - 4 - pyranol which comprises condensing formaldehyde with acetone in a molal ratio of not substantially less than six moles of formaldehyde per mole of acetone, at a temperature within the approximate range of 40–100° C. in the presence of an alkaline catalyst in the amount of from about 0.25 to 0.75 mole per mole of acetone, and stopping the reaction when the reaction mixture contains largely tetrahydro-3,3,5,5-tetrakis-(hydroxymethyl) - 4-pyranol.

8. Process for the production of tetrahydro-3,3,5-tris-(hydroxymethyl)-5-methyl - 4 - pyranol which comprises condensing formaldehyde with methyl ethyl ketone in a molal ratio of not substantially less than five moles of formaldehyde per mole of methyl ethyl ketone, at a temperature within the approximate range of 40–100° C. in the presence of an alkaline catalyst in the amount of from about 0.25 to 0.75 mole per mole of methyl ethyl ketone, and stopping the reaction when the reaction mixture contains largely tetrahydro-3,3,5-tris-(hydroxymethyl)-5-methyl-4-pyranol.

HAROLD WITTCOFF.

REFERENCES CITED

The following references are of record in the file of this patent:

UNITED STATES PATENTS

| Number | Name | Date |
| --- | --- | --- |
| 2,303,370 | Kugler | Dec. 1, 1942 |
| 2,395,414 | Lincoln, et al. | Feb. 26, 1946 |

FOREIGN PATENTS

| Number | Country | Date |
| --- | --- | --- |
| 381,686 | Great Britain | Oct. 13, 1932 |

OTHER REFERENCES

Apel et al.: Annalen, 289, 46–51 (1896).

White: Journal Chemical Society, London, 1943, pages 25 to 31.

Morgan: Journal Chemical Society, London, 1932, pages 2667–73.

Dimroth: Berichte, 75B (1942), pages 326–31.

Ser. No. 340,225, Natta (A. P. C.), published April 20, 1943.